(12) United States Patent
Jammet et al.

(10) Patent No.: US 10,300,673 B2
(45) Date of Patent: May 28, 2019

(54) HIGHLY DECORATED TUBE, ESPECIALLY HIGHLY DECORATED LAMINATE TUBE

(71) Applicant: ALBEA SERVICES, Gennevilliers (FR)

(72) Inventors: Jean-Claude Jammet, Amiens (FR); Philip Ashman, Woodbridge (GB); John Suter, Bethlehem, PA (US)

(73) Assignee: ALBEA SERVICES, Gennevilliers (FR)

( * ) Notice: Subject to any disclaimer, the term of this patent is extended or adjusted under 35 U.S.C. 154(b) by 117 days.

(21) Appl. No.: 15/126,340

(22) PCT Filed: May 29, 2015

(86) PCT No.: PCT/EP2015/061944
§ 371 (c)(1),
(2) Date: Sep. 15, 2016

(87) PCT Pub. No.: WO2015/181350
PCT Pub. Date: Dec. 3, 2015

(65) Prior Publication Data
US 2017/0080669 A1 Mar. 23, 2017

(30) Foreign Application Priority Data
May 30, 2014 (EP) .................... 14170593

(51) Int. Cl.
*B32B 27/30* (2006.01)
*B32B 1/08* (2006.01)
(Continued)

(52) U.S. Cl.
CPC ............... *B32B 1/08* (2013.01); *B29C 65/02* (2013.01); *B29C 66/1122* (2013.01); *B29C 66/4322* (2013.01); *B29C 66/71* (2013.01); *B29C 66/7234* (2013.01); *B29C 66/73713* (2013.01); *B32B 1/02* (2013.01); *B32B 27/08* (2013.01); *B32B 27/30* (2013.01); *B32B 27/306* (2013.01);
(Continued)

(58) Field of Classification Search
CPC .. B32B 1/02; B32B 1/08; B32B 27/32; B32B 27/327; B32B 27/36; B32B 27/30; B32B 27/306; B65D 35/08; B65D 35/10
See application file for complete search history.

(56) References Cited

U.S. PATENT DOCUMENTS

2005/0006385 A1* 1/2005 D'Amato ................. B65D 3/06
220/62
2006/0240546 A1* 10/2006 Goodwin ............... C12M 23/14
435/289.1
2008/0286512 A1 11/2008 Holzmuller et al.

FOREIGN PATENT DOCUMENTS

DE 102007027873 A1 11/2008
WO 2011/083499 A2 7/2011

OTHER PUBLICATIONS

Aug. 20, 2015—International Search Report and Written Opinion of PCT/EP2015/061944.

* cited by examiner

*Primary Examiner* — Walter Aughenbaugh
(74) *Attorney, Agent, or Firm* — Banner & Witcoff, Ltd.

(57) ABSTRACT

A flexible tube skirt (10) has a primary film (20) and a decorative film (30), wherein the decorative film (30) has a decoration substrate and a sealable outer layer (33) The decoration substrate is applied on all of at least one of the surfaces of the primary film (20) and is below the sealable outer layer (33). The flexible tube skirt may be used in a flexible tube.

11 Claims, 2 Drawing Sheets

Figure 1:
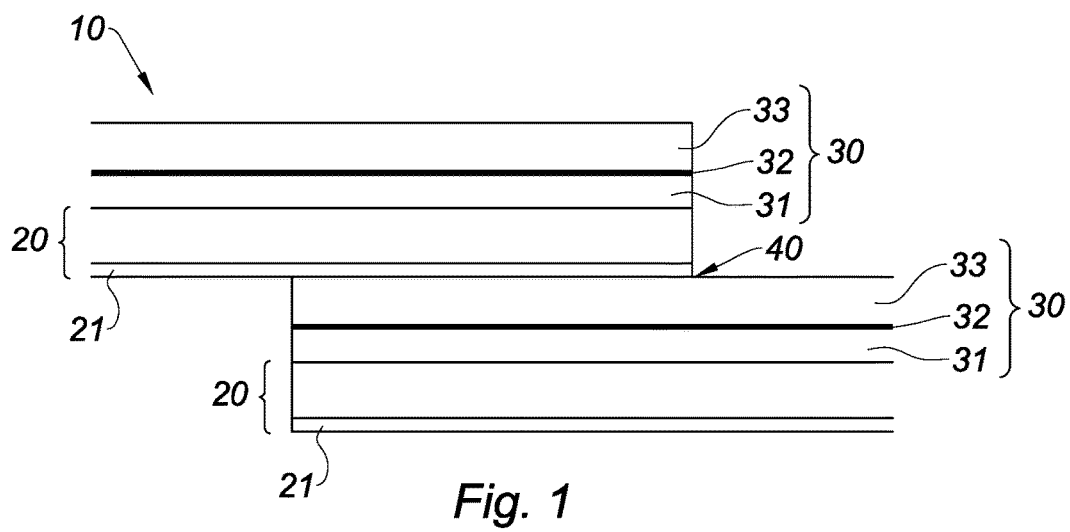

(51) Int. Cl.
*B32B 27/32* (2006.01)
*B32B 1/02* (2006.01)
*B65D 35/10* (2006.01)
*B32B 27/08* (2006.01)
*B32B 27/36* (2006.01)
*B65D 35/08* (2006.01)
*B29C 65/00* (2006.01)
*B29C 65/02* (2006.01)
*B29L 23/20* (2006.01)

(52) U.S. Cl.
CPC ............ *B32B 27/32* (2013.01); *B32B 27/327* (2013.01); *B32B 27/36* (2013.01); *B65D 35/08* (2013.01); *B65D 35/10* (2013.01); *B29C 2795/002* (2013.01); *B29L 2023/20* (2013.01)

HIGHLY DECORATED TUBE, ESPECIALLY HIGHLY DECORATED LAMINATE TUBE

CROSS-REFERENCE TO RELATED APPLICATIONS

The present application is a U.S. National Phase filing of International Application No. PCT/EP2015/061944, filed on May 29, 2015, designating the United States of America and claiming priority to European Patent Application No. 14170593.9 filed May 30, 2014. The present application claims priority to and the benefit of all the above-identified applications, which are all incorporated by reference herein in their entireties.

The present invention relates to flexible tube skirts for tube with highly decorated outer surface, particularly for tube designed to store and distribute liquid to pasty products, and more particularly cosmetic and toiletry products.

Appearance standards and decoration are very important in the field of laminate tubes, especially for cosmetic and toiletry products. The tubes are often required with a highly decorated surface, including bright metallic, holographic effects and customised colours.

It is known to obtain a highly decorated surface by using traditional extrusion- or adhesive-lamination of multiple films such as metallised or printed films incorporating various substrates (PET, PP, or PE). These methods require the use of several separate films being laminated together by extrusion- or adhesive-lamination. Consequently, each of the separate films are produced with different process and has uneven levels of molecular orientation, leading to thermal distortion of the final laminated structure and a susceptibility to stress-cracking.

Furthermore, to achieve an overlap side seam during tube formation, it is generally necessary to avoid decoration in the side seam region because of its lack of resistance to the welding conditions and/or its disturbance to the welding step. The result is that an undecorated line is visible along the length of the tube in the area of the overlapped side seam weld.

Therefore, there is a need for a material for a flexible tube skirt providing better global appearance even in the side seam region.

In order to reach the above-mentioned attempt, the present invention concerns a flexible tube skirt, especially a laminate skirt comprising a primary film and a decorative film, wherein said decorative film comprises a decoration substrate and a sealable outer layer, said decoration substrate being applied on all of at least one of the surfaces of said primary film and being below said sealable outer layer.

The decoration substrate being below the sealable outer layer, it can be protected from heat distortion, scratches or others damages which may occur during the manufacturing process and/or the storage and/or the use of the flexible tube. The sealable layer further providing a welding surface over the decoration substrate, the latter can be provided, in this way on the entire circumference and the surface of the finished tube, even in critical regions generally avoided with known method.

According to different aspects of the invention which can be taken alone or in combination:
the flexible tube skirt comprises an overlap side seam,
a layer of the decorative film (30) is directly sealed with a layer of the primary film,
said sealable outer layer of the decorative film is sealed with an outer sealable layer of the primary film,
said sealable outer layer of the decorative film is a heat sealable layer,
said sealable outer layer of the primary film is a heat sealable layer,
said decoration substrate is in the region of the side seam,
said decoration substrate comprises a base layer and a decoration, said decoration being applied on said base layer,
said decoration is a metallized, holographic and/or printed surface,
said base layer is selected from polypropylene (PP), polyethylene (PE) and/or polyethylene terephthalate (PET),
said decoration is directed toward said sealable outer layer of the decorative film,
said decoration is directed toward said primary film,
said base layer has a thickness between 5 and 50 µm, more preferably between 10 and 30 µm,
said sealable outer layer of said decorative film is transparent,
said sealable outer layer of said decorative film comprises PE material,
said sealable outer layer of said decorative film has a thickness between 5 and 90 µm, more preferably between 10 and 80 µm
said decorative film is further printed on the decoration and/or on the sealable outer layer,
said primary film is a blown film,
said base layer of the decorative film is applied on a upper layer of said primary film,
said primary film is a multi-layer film representing at least 70% by mass of the final flexible tube skirt,
said primary film has a thickness between 100 and 500 µm, more preferably between 200 and 350 µm,—said primary film is a multilayer film comprising at least one barrier layer, such as an ethylene vinyl alcohol (EVOH) layer, or nylon or amorphous polyamide (APA),
said primary film is a multilayer film consisting of polymer layers not including a barrier layer,
said primary film comprises between three and twenty-two layers,
said primary film is printed on a surface directed toward said decorative film,
said primary film and said decorative film are assembled by solvent adhesive, solvent free adhesive, UV adhesive-lamination or by extrusion-lamination;
said sealable outer layers of the decorative film and the primary film are composed of medium density polyethylene (MDPE),
the flexible tube skirt can be printed (with ink) over the sealable outer layer of the decorative film.

The present invention also concerns a flexible tube comprising a flexible tube skirt as described previously.

The present invention concerns as well a method of manufacturing a flexible tube skirt as described previously, said process comprising:
assembling said primary film and said decorative film as a strip;
producing a cylindrical sleeve by rolling said strip;
forming a side seam along said sleeve by overlap welding of two opposite longitudinal side of said strip;
wherein said decoration substrate of the decorative film is applied over all of at least one of the surfaces of said primary film, including in the region of the side seam.

To limit the distortion and/or stress-cracking of the final structure, the flexible tube skirt has to be obtained by a minimum of steps and by the assembly of a limited number of films. In the present invention, the laminate product is obtained by the assembly of two films, limiting the risk of delamination and distortion.

According to different aspects of the invention which can be taken alone or in combination:
   said process further comprises an initial step of providing said primary film and said decorative film,
   said primary film and said decorative film are assembled by solvent adhesive, solvent free adhesive, UV adhesive-lamination or by extrusion-lamination,
   cutting said sleeve to the desired length to obtain said flexible tube skirt.

Figure 2:
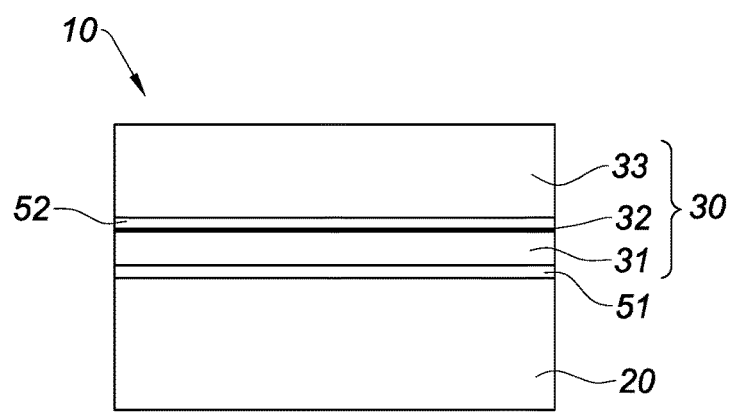
Figure 3:
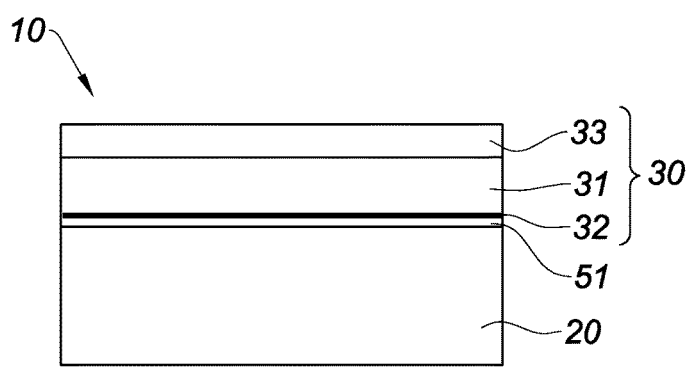
Figure 4:
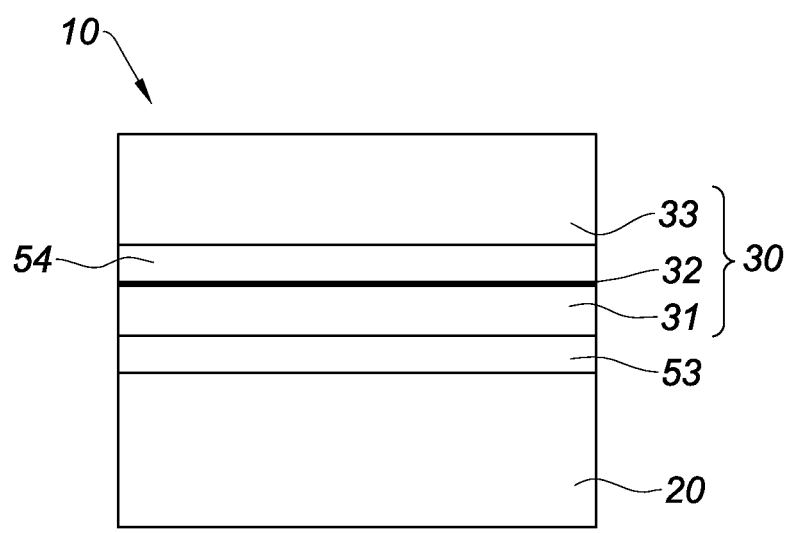
Figure 5:
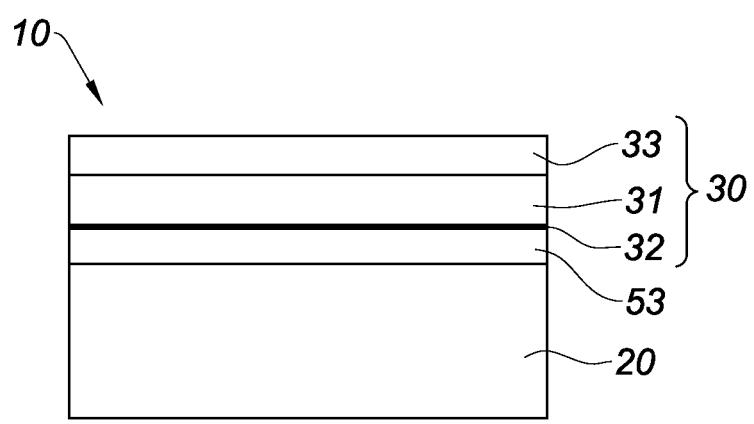

The invention will be better understood and other objects, details, features and advantages thereof will become more clearly apparent in the following detailed explanatory description of at least one embodiment given as an illustrative and non-limiting example with reference to the attached drawings, in which:

FIG. 1 is a schematic representation of a flexible tube skirt according to the invention and showing an overlap side seam, FIG. 2 is a schematic representation of a flexible tube skirt according to a first embodiment, obtained by adhesive-lamination, FIG. 3 is a schematic representation of a flexible tube skirt according to a second embodiment, obtained by adhesive-lamination, FIG. 4 is a schematic representation of a flexible tube skirt according to a third embodiment, obtained by extrusion-lamination, FIG. 5 is a schematic representation of a flexible tube skirt according to a fourth embodiment, obtained by extrusion-lamination.

In all the figures, common elements are provided with identical reference numerals.

In the different FIGS. 1 to 5, the flexible tube skirt 10 comprises a primary film 20 and a decorative film 30. In each embodiment, the decorative film 30 comprises a decoration substrate and a sealable outer layer 33. According to the invention, the decoration substrate is applied on all of at least one of the surfaces of said primary film 20 and is below the sealable outer layer 33. In other words, there is no area of the primary film 20 not covered by both the decoration substrate and the sealable outer layer 33.

The decoration substrate can comprise a base layer 31 and a decoration 32. The decoration 32 is applied on said base layer 31. In such embodiment, the primary film is entirely covered by said base layer 31 which is entirely covered by said decoration 32 which is entirely covered by said sealable outer layer 33.

The base layer 31 can be selected from polypropylene (PP), polyethylene (PE) and/or polyethylene terephthalate (PET). Preferably, the base layer 31 has a thickness between 5 and 50 µm, more preferably between 10 and 30 µm.

Preferably, the decoration 32 is applied on one surface of the base layer 31 so that the decoration 32 is directed toward the sealable outer layer 33 of the decorative film 30 or toward the primary film 20.

In the embodiments shown in FIGS. 2 and 4, the base layer 31 is polyethylene terephthalate (PET) and the decoration 32 is directed toward the sealable outer layer 33 of the decorative film 30.

In the embodiments shown in FIGS. 3 and 5, the base layer 31 is biaxially oriented polypropylene (BOPP) and the decoration 32 is directed toward the primary film 20. In this embodiment, the base layer 31 is preferably transparent, so that the decoration 32 is clearly visible.

The decoration 32 can be a metallized, holographic and/or printed surface and the sealable outer layer 33 of the decorative film function as a protective layer, especially in the embodiments of FIGS. 2 and 4. In all the embodiments, the sealable outer layer 33 is preferably transparent so that the decoration is clearly visible from outside the tube. It can comprise a PE material and it can be a multilayer or a coating comprising PE. Generally, the sealable outer layer 33 of said decorative film 30 has a thickness between 5 and 90 µm, more preferably between 10 and 80 µm. The thickness of the sealable outer layer 33 can depend, for example, of the nature of the different layers.

Once formed, the flexible tube skirt can comprise an overlap side seam 40, i.e. a seam obtained by the superposition of two opposite sides of a laminated film, as shown in FIG. 1. Preferably, the primary film 20 is a multilayer film that can comprise an outer sealable layer 21 that is sealed with the sealable outer layer 33 of the decorative film 30.

The side seam can be done by method known in the tube industry. In particular, it can be obtained by heat sealing. In this case, the outer sealable layer 21 of the primary film and the sealable outer layer 33 of the decorative film 30 are heat sealable outer layers.

In the present invention, the outer sealable layer 33 of the decorative film 30 allow to have the decoration 32 applied on all of at least one of the surfaces of said base layer 31 even in the region of the side seam 40, as shown in FIG. 1.

To complete and enhance the decorative aspect of the tube, the decorative film 30 can be further printed on the decoration 32 and/or on the sealable outer layer 33 and/or on the primary film 20 on a surface directed toward said decorative film 30. Known surface printing methods can be used, such as UV-flexographic method.

The primary film 20 can be a blown film, i.e. a film obtained by co-extruding several polymer material compositions as hot melts through a die in the form of a tube and blowing cooling air currents thereon to form a cylindrical bubble. Once the blown film bubble has cooled, it is then collapsed at a desired point by nip rollers, and a multilayer primary film is obtained with a uniform thickness. The blown film technology is well known in the art.

With such technology, the different layers of the primary film have a similar molecular orientation profile and do not exhibit conflicting molecular orientation profiles and/or stress patterns. As a result, the respective layers do not exhibit competing forces or stresses and does not suffer of weakness in terms of stress cracking and/or delamination. In addition, once formed the final flexible tube does not suffer from ovality and other distortions, which can ultimately compromise the structural integrity of the final product.

As said before, the primary film 20 can be a multilayer film. Preferably it comprises between three and twenty-two layers. At least one of the layers can be a barrier layer, such as an ethylene vinyl alcohol (EVOH) layer. The others layers can be selected from polyethylene, such as low density polyethylene (LDPE), linear low density polyethylene (LLDPE), medium density polyethylene (MDPE), high density polyethylene (HDPE) or their mixture, or ethylene vinyl acetate (EVA). Between the different layers, a tie layer and/or an adhesive coating can be applied to enhance the adherence for example, notably on the barrier layer surfaces. Preferably the primary film 20 has a thickness between 100 and 500 µm, more preferably between 200 and 350 µm.

Among the layers of the skirt, the primary film 20 comprises the layers located between a lower layer in contact with the interior of the tube (for example the sealable outer layer 21 of FIG. 1) and an upper layer adjacent to an assembly layer (for example layers 51 or 53 shown in FIGS. 2 to 5) situated between the primary film 20 and the decorative film 30, and more precisely between the primary film 20 and the base layer 31, i.e. the layer on which the decoration 32 is applied.

In a preferred embodiment, the primary film 20 represents at least 70% by mass of the final flexible tube skirt 10, taking into account the lower layer, the upper layer and all the layers in between.

The primary film 20 and the decorative film 30 can be assembled by method known in the art. It can be with solvent adhesive, solvent free adhesive, UV adhesive-lamination or by extrusion-lamination. Generally, the decoration substrate and the outer sealable layer 33 can also be assembled using similarly methods.

In the case of an adhesive-lamination process, shown in FIGS. 2 and 3, the flexible tube skirt can comprise an adhesive layer 51 mentioned before as assembly layer and delimiting the primary film and the decorative film. The adhesive layer 51 can comprise polyurethane.

In the embodiment shown in FIG. 2, the sealable outer layer 33 is assembled to the decorated base layer 31 with an adhesive layer, such as the layer 52, which can comprise polyurethane.

In the case of an extrusion-lamination process, shown in FIGS. 4 and 5, the flexible tube skirt can comprise an extrusion layer 53 mentioned before as assembly layer and delimiting the primary film and the decorative film. The extrusion layer can be a monolayer called tie layer or can comprise two layers, a tie layer and a PE layer, such as low density polyethylene (LDPE). The tie layer can comprise an ethylene acrylic acid copolymer (EAA).

In the embodiment shown in FIG. 4, the sealable outer layer 33 is assembled to the decorated base layer 31 with an extrusion layer, such as the layer 54, which can be a monolayer called tie layer comprising an ethylene acrylic acid copolymer (EAA) or can comprise two layers, a tie layer comprising an ethylene acrylic acid copolymer (EAA) and a PE layer, such as low density polyethylene (LDPE).

The sealable outer layer 33 can be assembled to the decorated base layer 31 with an adhesive layer such as the layer 52 in FIG. 2 or with an extrusion layer such as the layer 54 in FIG. 4. Alternatively, the layer 54 and the sealable outer layer 33 may be produced by co-extrusion, thereby coating the decoration 32 in FIG. 4 or the base layer 31 in FIG. 5.

Coming to the specific embodiment of FIG. 2, it comprises, from the inside to the outside:

the primary film 20,
the adhesive layer 51,
the base layer 31,
the decoration 32,
the adhesive layer 52,
the sealable outer layer 33.

Coming to the specific embodiment of FIG. 3, it comprises, from the inside to the outside:

the primary film 20,
the adhesive layer 51,
the decoration 32,
the base layer 31,
the sealable outer layer 33.

Coming to the specific embodiment of FIG. 4, it comprises, from the inside to the outside:

the primary film 20,
the extrusion layer 53,
the base layer 31,
the decoration 32,
the extrusion layer 54,
the sealable outer layer 33.

Coming to the specific embodiment of FIG. 5, it comprises, from the inside to the outside:

the primary film 20,
the extrusion layer 53,
the decoration 32,
the base layer 31,
the sealable outer layer 33.

Here are some detailed examples of structures according to the invention.

EXAMPLE 1

| Layer | Material Type | Density (g/cm3) | Thickness (μ) | Correspondance with FIGS. |
|---|---|---|---|---|
| 1 | MDPE | 0.934 | 15 | Sealable outer layer (33) |
| 2 | MDPE | 0.934 | 22 | |
| 3 | MDPE | 0.934 | 13 | |
| 4 | Adhesive lamination | | 4 | Adhesive layer (52) |
| 5 | PET film | 1.417 | 12 | Decoration (32) + base layer (31) |
| 6 | Adhesive lamination | | 4 | Adhesive layer (51) |
| 7 | MDPE (clear) | 0.934 | 109 | Primary film (20) |
| 8 | Tie | 0.91 | 7 | |
| 9 | EVOH | 1.17 | 10 | |
| 10 | Tie | 0.92 | 7 | |
| 11 | Adhesive layer EVA | 0.941 | 17 × 2 | |
| 12 | Tie | 0.92 | 7 | |
| 13 | EVOH | 1.17 | 10 | |
| 14 | Tie | 0.91 | 7 | |
| 15 | MDPE (clear) | 0.934 | 109 | |

EXAMPLE 2

| Layer | Material Type | Density (g/cm3) | Thickness (μ) | Correspondance with FIG. 2 |
|---|---|---|---|---|
| 1 | MDPE | 0.934 | 15 | Sealable outer layer (33) |
| 2 | MDPE | 0.934 | 22 | |
| 3 | MDPE | 0.934 | 13 | |
| 4 | Adhesive lamination | | 4 | Adhesive layer (52) |
| 5 | PET film | 1.417 | 12 | Decoration (32) + base layer (31) |
| 6 | Adhesive lamination | | 4 | Adhesive layer (51) |
| 7 | MDPE (clear) | 0.934 | 59 | Primary film (20) |
| 8 | MDPE (white color) | 0.934 | 50 | |
| 9 | Tie | 0.91 | 7 | |
| 10 | EVOH | 1.17 | 10 | |
| 11 | Tie | 0.92 | 7 | |
| 12 | Adhesive layer EVA | 0.941 | 17 × 2 | |
| 13 | Tie | 0.92 | 7 | |
| 14 | EVOH | 1.17 | 10 | |
| 15 | Tie | 0.91 | 7 | |
| 16 | MDPE (white color) | 0.934 | 50 | |
| 17 | MDPE (clear) | 0.934 | 59 | |

Avantageously, the first and the last layers (layer 1 and layer 17) are composed of MDPE, for a better sealing. In other terms, the sealable outer layers of the decorative film and the primary film are composed of MDPE.

The melt flow index of MDPE is in a range between 0.9 to 3.5 gm per 10 minutes (2.16 kg, 190 degrees Celsius).

The melting point of MDPE is in a range between 122 and 125 degrees Celsius.

EXAMPLE 3

| Layer | Material Type | Thickness (μ) | Correspondance with FIG. 2 |
|---|---|---|---|
| 1 | LLDPE | 15 | Sealable outer layer (33) |
| 2 | MDPE | 22 | |
| 3 | LLDPE | 13 | |
| 4 | Adhesive lamination | | Adhesive layer (52) |
| 5 | Metallized PET film with metal up | 12 | Decoration (32) + base layer (31) |
| 6 | Adhesive lamination | | Adhesive layer (51) |
| 7 | MDPE | 72 | Primary film (20) |
| 8 | Tie | 7 | |
| 9 | EVOH | 7 | |
| 10 | Tie | 7 | |
| 11 | MDPE | 40 | |
| 12 | Adhesive layer EVA | 17.3 × 2 | |
| 13 | MDPE | 40 | |
| 14 | Tie | 7 | |
| 15 | EVOH | 7 | |
| 16 | Tie | 7 | |
| 17 | MDPE | 72 | |

The invention claimed is:

1. A flexible tube skirt comprising a primary film and a decorative film,
wherein said decorative film comprises a decoration substrate having a first surface and a second surface opposite the first surface and a sealable outer layer applied to the first surface of the decoration substrate,
said primary film having a first surface and a second surface opposite the first surface, said second surface of the primary film comprising an outer sealable layer,
said second surface of the decoration substrate being applied on all of the first surface of said primary film, the flexible tube skirt comprising an overlap side seam, wherein said sealable outer layer of the decorative film is sealed with the outer sealable layer of the primary film, the decoration substrate being present in the overlap side seam,
said primary film being a multilayer comprising at least one ethylene vinyl alcohol (EVOH) barrier layer.

2. A flexible tube skirt according to claim 1, wherein said decoration substrate comprises a base layer and a decoration, said decoration being applied on said base layer.

3. A flexible tube skirt according to claim 2, wherein said decoration is applied to form a metallized, holographic and/or printed surface on the base layer.

4. A flexible tube skirt according to claim 2, wherein said base layer is selected from polypropylene, polyethylene and/or polyethylene terephthalate.

5. A flexible tube skirt according to claim 2, wherein said decoration is applied to be visible through said sealable outer layer of the decorative film and/or visible through said primary film.

6. A flexible tube skirt according to claim 2, wherein said decorative film further comprises printing on the decoration and/or on the sealable outer layer.

7. A flexible tube skirt according to claim 1, wherein said sealable outer layer of said decorative film is transparent and comprises PE material.

8. A flexible tube skirt according to claim 1, wherein said primary film is a blown film.

9. A flexible tube skirt according to claim 8, wherein said primary film is a multi-layer film representing at least 70% by mass of the final flexible tube skirt.

10. A flexible tube skirt according to claim 1, wherein said primary film is printed on its first surface.

11. A flexible tube comprising a flexible tube skirt according to claim 1.

* * * * *